(12) United States Patent
Imanuel

(10) Patent No.: US 12,190,663 B2
(45) Date of Patent: Jan. 7, 2025

(54) OVER THE AIR UPDATE FOR IoT DEVICES, SUCH AS WIRELESS ELECTRONIC LOCKS

(71) Applicant: ASSA ABLOY Americas Residential Inc., New Haven, CT (US)

(72) Inventor: Derek Imanuel, Irvine, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 34 days.

(21) Appl. No.: 18/052,769

(22) Filed: Nov. 4, 2022

(65) Prior Publication Data

US 2023/0169808 A1 Jun. 1, 2023

Related U.S. Application Data

(60) Provisional application No. 63/276,364, filed on Nov. 5, 2021.

(51) Int. Cl.
G07C 9/00 (2020.01)
(52) U.S. Cl.
CPC ..... *G07C 9/00309* (2013.01); *G07C 9/00571* (2013.01); *G07C 2009/00357* (2013.01)
(58) Field of Classification Search
None
See application file for complete search history.

(56) References Cited

U.S. PATENT DOCUMENTS

| 9,472,034 | B2 * | 10/2016 | Ahearn | G07C 9/00174 |
| 11,392,365 | B2 * | 7/2022 | Tsfasman | G06F 8/65 |
| 2012/0068817 | A1 * | 3/2012 | Fisher | G07C 9/00571 340/5.61 |
| 2014/0049365 | A1 * | 2/2014 | Ahearn | G07C 9/00309 340/5.51 |
| 2016/0379428 | A1 | 12/2016 | Ahearn et al. | |
| 2017/0123782 | A1 | 5/2017 | Choi | |
| 2017/0147322 | A1 | 5/2017 | Vopni et al. | |
| 2019/0196807 | A1 | 6/2019 | Coolidge | |
| 2020/0105078 | A1 | 4/2020 | Nguyen et al. | |
| 2020/0329136 | A1 * | 10/2020 | Gerhardt | H04L 63/0492 |
| 2022/0335764 | A1 | 10/2022 | Immanuel | |
| 2022/0406113 | A1 * | 12/2022 | Imanuel | G07C 9/00309 |

OTHER PUBLICATIONS

International Search Report and Written Opinion for PCT/US2022/079157, mailed Feb. 27, 2023.

* cited by examiner

*Primary Examiner* — K. Wong
(74) *Attorney, Agent, or Firm* — Merchant & Gould, P.C.

(57) ABSTRACT

In general, the present disclosure relates to methods and systems for updating wireless electronic locks. One aspect is a method for updating wireless electronic locks, the method comprising scanning, by the computing device, for signals broadcast from wireless electronic locks within proximity to the computing device, the electronic locks being compatible with a mobile application executing on the computing device, while scanning, recording signal strengths of the signals broadcast from the wireless electronic locks, determining a set of the wireless electronic locks which are within an acceptable range for updating based on the signal strengths, and sending updates from the computing device to the set of the wireless electronic locks.

20 Claims, 14 Drawing Sheets

OVER THE AIR UPDATE FOR IoT DEVICES, SUCH AS WIRELESS ELECTRONIC LOCKS

CROSS-REFERENCE TO RELATED APPLICATIONS

The present application claims priority, to the extent appropriate, to U.S. Provisional Patent Application No. 63/276,364, filed Nov. 5, 2021, the disclosure of which is hereby incorporated in its entirety.

BACKGROUND

Electronic locks have gained increasing acceptance and widespread use in residential and commercial markets due to the many benefits they provide. One such benefit is the ability to lock or unlock a door with the use of a mobile device, such as a smartphone or tablet. In some scenarios, multiple electronic locks are installed at one time. For example, multiple electronic locks may be installed in a multifamily structure (e.g., a condominium, apartment complex, hotel, or other multi-unit building), commercial building, or residential building with multiple entrances.

The electronic locks include firmware and software installed on the lock during the manufacturing process. The software or firmware may include updates which are available after the lock is manufactured but before the electronic lock is installed. In these examples, the electronic lock downloads and installs the updates at some point after the user configures and activates the lock. The updates may include fixing security vulnerabilities with the lock or updating other critical lock functions.

SUMMARY

In general, the present disclosure relates to methods and systems for updating wireless electronic locks. In some examples, the updates are provided wirelessly to the wireless electronic locks via a computing device.

One aspect is a method for updating wireless electronic locks, the method comprising scanning, by the computing device, for signals broadcast from wireless electronic locks within proximity to the computing device, the electronic locks being compatible with a mobile application executing on the computing device; while scanning, recording signal strengths of the signals broadcast from the wireless electronic locks; determining a set of the wireless electronic locks which are within an acceptable range for updating based on the signal strengths; and sending updates from the computing device to the set of the wireless electronic locks.

Another aspect is a computing device comprising at least one processor and at least one memory device, wherein the at least one memory device includes instructions which, when executed by the at least one processor, cause the computing device to scan for signals broadcast from wireless electronic locks within proximity to the computing device and record signal strengths of the signals broadcast from the wireless electronic locks, the electronic locks being compatible with a mobile application executing on the computing device; determine a set of the wireless electronic locks which are within an acceptable range based on the signal strengths; and send updates to the set of the wireless electronic locks.

Yet another aspect is a method for installing and updating a plurality of wireless electronic locks. The method comprises installing the plurality of wireless electronic locks on a plurality of doors, wherein installation of a wireless electronic lock is completed when the wireless electronic lock is connected to a power source and updating the plurality of wireless electronic locks using a computing device; wherein the computing device is configured to scan for signals broadcast from the plurality of wireless electronic locks within proximity to the computing device and record signal strengths for the signals broadcast from the wireless electronic locks, the electronic locks being compatible with a mobile application executing on the computing device, determine a set of the wireless electronic locks which are within an acceptable range based on the recorded signal strengths, and send updates to the set of the wireless electronic locks.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
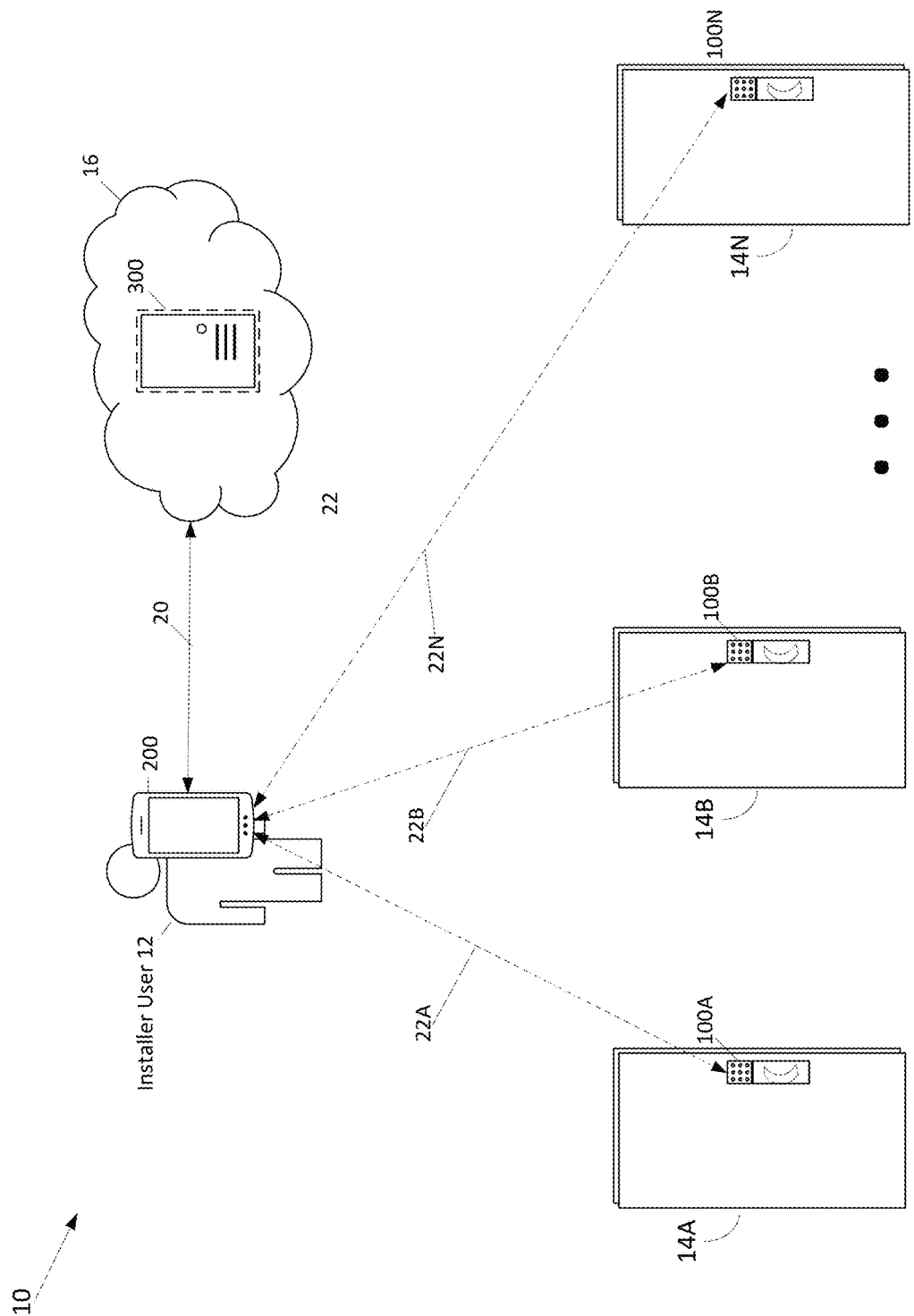
FIG. 1 illustrates an environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to methods and systems for updating wireless electronic locks. In some examples, the updates are provided wirelessly to the wireless electronic locks via a computing device using Bluetooth, via a process in which user intervention is minimized. In particular, in some examples, a set of wireless electronic locks may be selected by a user seeking to provide firmware updates to such locks. Software instructions on that user's mobile device, as well as software facilitating communication for such wireless updates on the wireless electronic locks themselves, allow for reduced requirements for manual intervention to separately initiate connections to each electronic lock, thereby providing rapid and largely automated updates of one or a series of electronic locks.

FIG. 1 illustrates an environment 10 in which aspects of the present disclosure may be implemented. Doors 14A-14N each have a wireless electronic lock 100A-100N (also referred to as an electronic lock). In some embodiments, the electronic locks 100A-100N are installed at a premises by an installer user 12. The installer user 12 is an authorized user, such as an owner of the premises or an installation agent of the owner, where the doors 14A-14N comprising the wireless electronic locks 100A-100N (collectively referred to as the wireless electronic locks 100, or simply electronic locks 100) are installed. The installer user 12 has a computing device 200 with wireless communication capabilities, such as a smartphone or tablet. The computing device 200 is capable of communicating 20 with a server 300 and communicating 22A-22N with the wireless electronic locks 100. In some embodiments, the installer user 12 installs each of the wireless electronic locks 100 in a row and then performs a firmware update and reset for each of the locks. In some embodiments, the electronic locks are updated sequentially and, in some alternative embodiments, the electronic locks are updated simultaneously.

The server 300 can be, for example, a physical server or a virtual server hosted in a cloud storage environment 16. In some embodiments, the wireless electronic locks 100 are also capable of communicating with the server 300, for example, after the lock is provisioned to an admin or guest user. Such communication can optionally occur via one or more wireless communication protocols, e.g., Wi-Fi (IEEE 802.11), short-range wireless communication to a Wi-Fi bridge, or other connection mechanism. According to an embodiment, the server 300 generally creates and stores an administrative user account associated with one or more of the wireless electronic locks 100, stores a pairing passcode for one or more of the wireless electronic locks 100, stores a guest user account associated with each of the electronic locks, and in some examples, upon creation of the guest user account, provides the pairing passcode to a guest mobile device. According to an aspect, when the pairing passcode is successfully entered using a keypad of one of the wireless electronic locks 100, the lock may enter a pairing mode which enables the lock to pair with a guest mobile device over a wireless connection, such as a Bluetooth connection.

Figure 2:
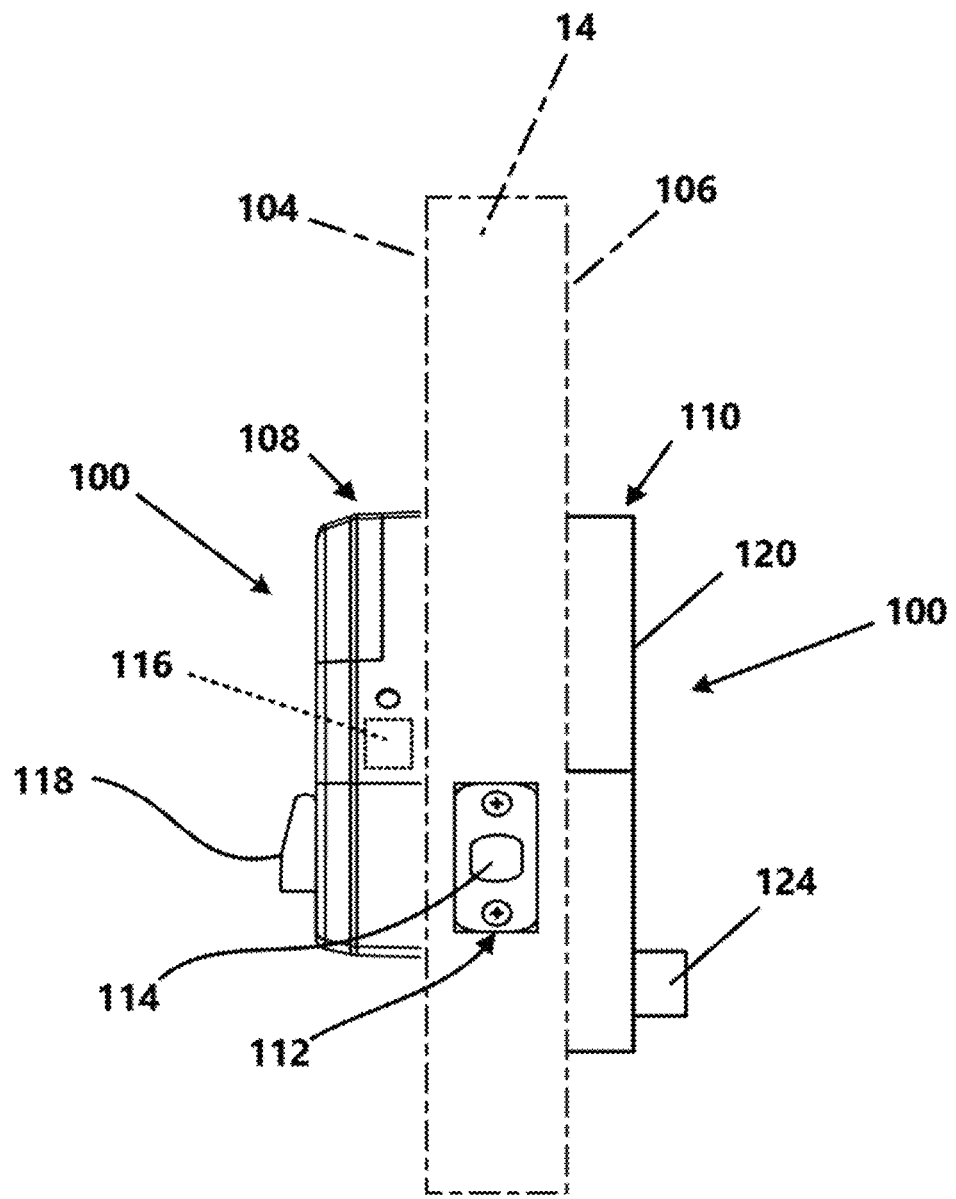
FIG. 2 illustrates a side view of a portion of the electronic lock seen in the environment of FIG. 1.
Figure 3:
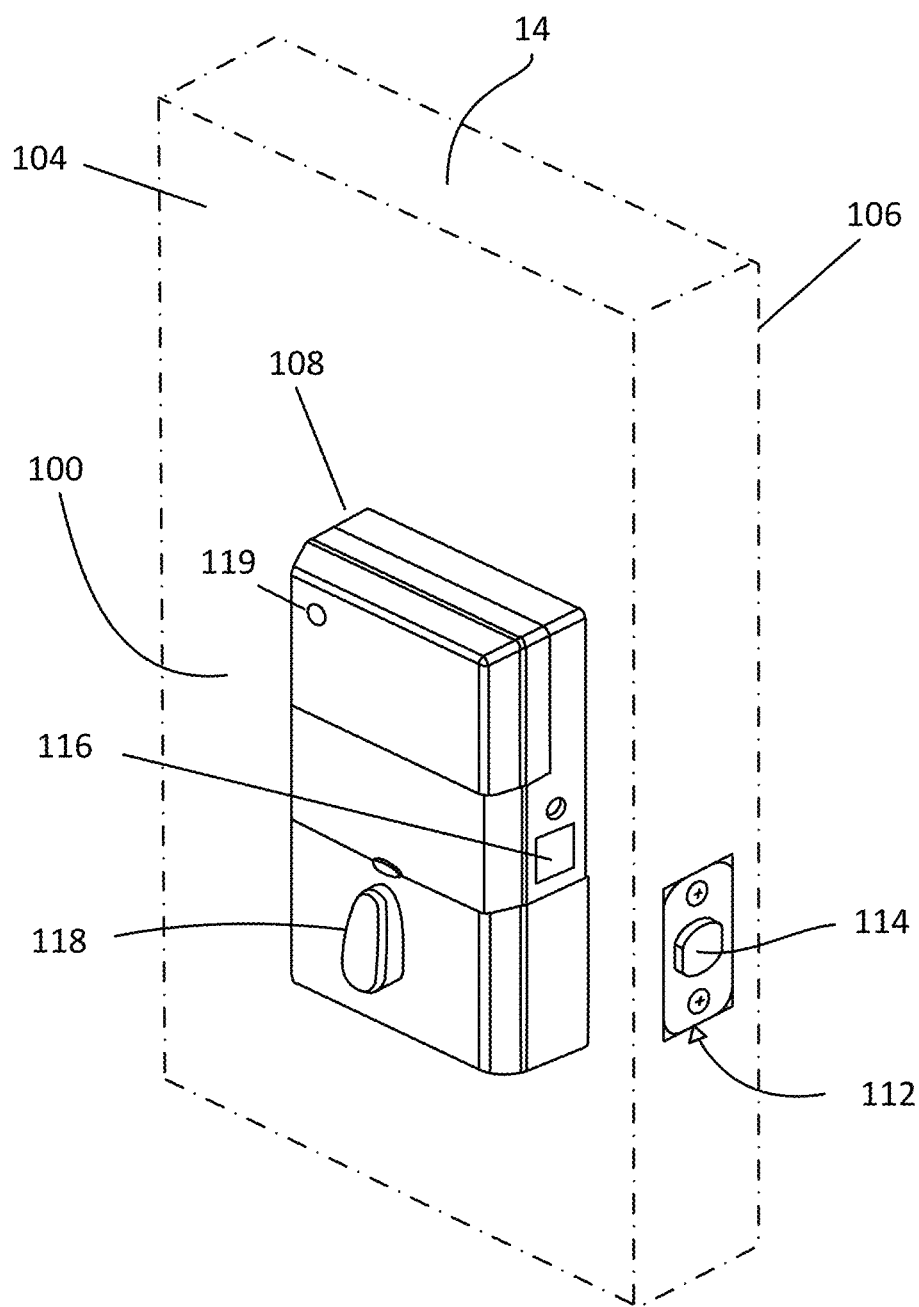
FIG. 3 illustrates a rear perspective view of a portion of the electronic lock seen in the environment of FIG. 1.
Figure 4:
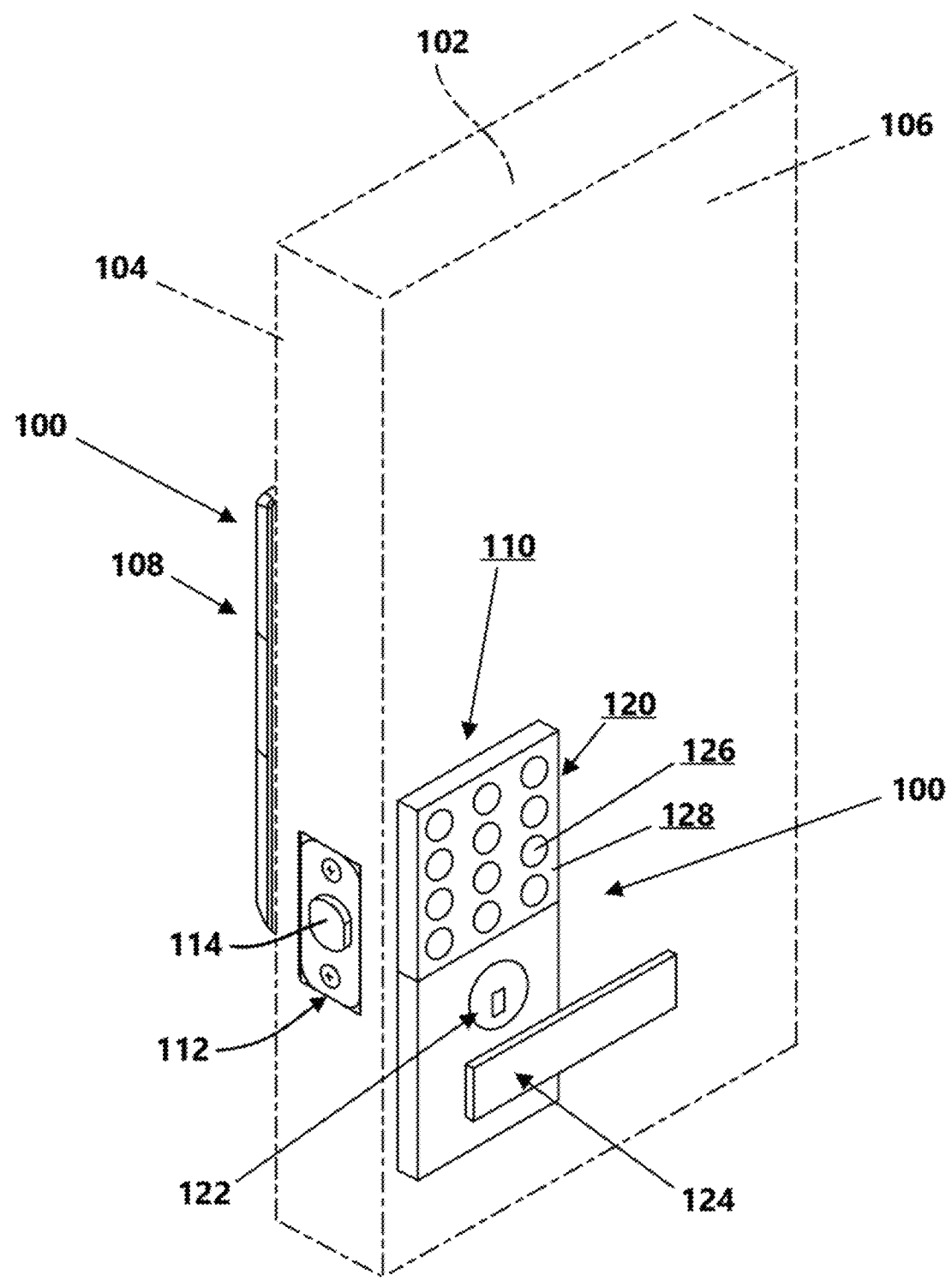
FIG. 4 illustrates a front perspective view of a portion of the electronic lock seen in the environment of FIG. 1.

FIGS. 2-4 illustrate a wireless electronic lock 100 (e.g., one of the wireless electronic locks 100A-N) as installed at a door 14 (e.g., the corresponding door of the doors 14A-N), according to one example of the present disclosure. The door 14 has an interior side 104 and an exterior side 106. The wireless electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 14 is in an unlocked state. When the bolt 114 is extended, the bolt 114 protrudes from the door 14 into a doorjamb (not shown) to place the door in a locked state.

In some examples, the interior assembly 108 is mounted to the interior side 104 of the door 14, and the exterior assembly 110 is mounted to the exterior side 106 of the door 14. The latch assembly 112 is typically at least partially mounted in a bore formed in the door 14. The term "outside" is broadly used to mean an area outside the door 14 and "inside" is broadly used to denote an area inside the door 14. With an exterior entry door, for example, the exterior assembly 110 may be mounted outside a building, while the interior assembly 108 may be mounted inside a building. With an interior door, the exterior assembly 110 may be mounted inside a building, but outside a room secured by the wireless electronic lock 100, and the interior assembly 108 may be mounted inside the secured room. The wireless electronic lock 100 is applicable to both interior and exterior doors.

Referring to FIG. 3, the interior assembly 108 can include a processing unit 116 (shown schematically) containing electronic circuitry for the wireless electronic lock 100. In some examples, the interior assembly 108 includes a manual turn piece 118 that can be used on the interior side 104 of door 14 to move the bolt 114 between the extended and retracted positions. The processing unit 116 is operable to execute a plurality of software instructions (i.e., firmware) that, when executed by the processing unit 116, cause the wireless electronic lock 100 to implement the methods and otherwise operate and have functionality as described herein. The processing unit 116 may comprise a device commonly referred to as a processor, e.g., a central processing unit (CPU), digital signal processor (DSP), or other similar device, and may be embodied as a standalone unit or as a device shared with components of the wireless electronic lock 100. The processing unit 116 may include memory communicatively interfaced to the processor, for storing the software instructions. Alternatively, the wireless electronic lock 100 may further comprise a separate memory device for storing the software instructions that is electrically connected to the processing unit 116 for the bi-directional communication of the instructions, data, and signals therebetween.

In typical embodiments, once the wireless electronic lock is installed and/or connected to a power source, the electronic lock enters a pairing mode to initiate a wireless connection to pair with a computing device (e.g., the computing device 200 shown in FIG. 1) of an installer user. In typical embodiments, software modules on the electronic lock and the computing device may be configured to automatically pair to establishing a wireless connection (e.g., a Bluetooth connection). In some embodiments, a Bluetooth Low Energy (BLE) protocol is used. In some alternative embodiments, the computing device or electronic lock broadcasts a Wi-Fi hotspot to wireless in order to connect with the other device. Other wireless connectivity technologies can also be used, as well as various combinations of wireless technologies. In some embodiments, no button or other interface on the electronic lock is needed to pair with the computing device. In some embodiments, the interior assembly 108 includes a pairing button 119 (shown schematically), which when actuated, initiates a wireless communication pairing mode. For example, the pairing mode may enable the wireless electronic lock 100 to communicate with a computing device (e.g., the computing device 200)

within wireless communication range for enabling the mobile device to be paired with the wireless electronic lock 100. As can be appreciated, initiating the wireless pairing mode via an actuation of the pairing button 119 may be limited to users who have access to the interior side 104 of the door 14.

As will be described in further detail below, aspects of the present disclosure enable a user, such as an installer user 12, to initiate a wireless communication with the wireless electronic lock 100 from a computing device instead of using pairing button 119. In such instances, a pairing sequence may be initiated that ultimately does not result in a persistent pairing (e.g., forming a bonded connection via Bluetooth) between the devices. In some instances, pressing the pairing button 119 may cause a persisted pairing arrangement to occur, while initiating a communication link between the electronic lock 100 and the computing device 200 using an application installed on the computing device 200 avoids the persisted pairing arrangement.

Referring to FIG. 4, the exterior assembly 110 can include exterior circuitry (e.g., the exterior circuitry 117 shown in FIG. 5) communicatively and electrically connected to the processing unit 116. For example, the exterior assembly 110 can include a keypad 120 for receiving a user input and/or a keyway 122 for receiving a key (not shown). The exterior side 106 of the door 14 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid actuation passcode into the keypad 120, the bolt 114 is moved between the extended and retracted positions. In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 14. When the user inputs a valid actuation passcode via the keypad 120 that is recognized by the processing unit 116, an electrical motor is energized to retract the bolt 114 of latch assembly 112, thus permitting door 14 to be opened from a closed position. In a particular embodiment, when a guest user inputs a valid pairing passcode into the keypad 120, the electronic lock 100 may enter into a pairing mode where the electronic lock 100 is enabled to communicate and be paired with the guest mobile device when the guest mobile device is within wireless communication range of the electronic lock 100. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters displayed thereon. For example, the keypad 120 can include a plurality of buttons 126 that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation.

In alternative embodiments, one or more other types of user interface devices can be incorporated into the wireless electronic lock 100. For example, in example implementations, the exterior assembly 110 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified actuation passcode.

Figure 5:
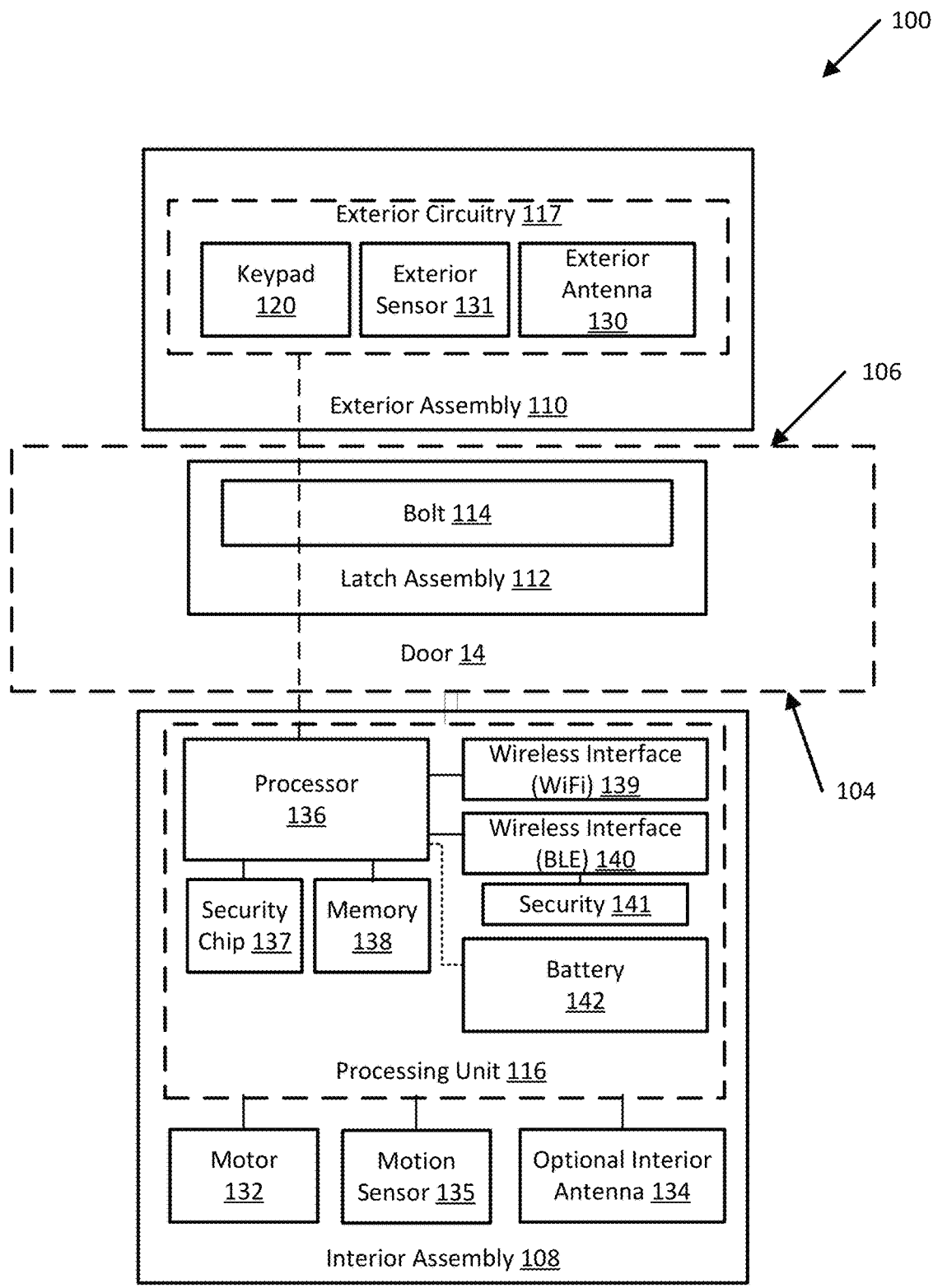
FIG. 5 illustrates a schematic representation of the electronic lock seen in the environment of FIG. 1.

FIG. 5 is a schematic representation of a wireless electronic lock 100 (e.g., one of the wireless electronic locks 100A-N) mounted to the door 14 (e.g., one of the corresponding doors A-N). The interior assembly 108, the exterior assembly 110, and the latch assembly 112 are shown.

The exterior assembly 110 is shown to include an exterior circuitry 117. The exterior circuitry 117 includes the keypad 120 and an optional exterior antenna 130 usable for communication with a remote device. In addition, the exterior assembly 110 can include one or more sensors 131, such as a camera, proximity sensor, or other mechanism by which conditions exterior to the door 14 can be sensed. In response to such sensed conditions, notifications may be sent by the wireless electronic lock 100 to a server 300, a computing device 200, an admin mobile device, and/or a guest mobile device including information associated with a sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device that is paired with the wireless electronic lock 100 and determined to be located on the exterior of the door 14 is able to actuate (unlock or lock) the door. This prevents unauthorized users from being located exterior to the door 14 of the wireless electronic lock 100 and taking advantage of an authorized mobile device that may be located on the interior of the door 14, even though that authorized mobile device is not being used to actuate the door. However, such a feature is not required, but can add additional security. In alternative arrangements, the wireless electronic lock 100 is only actuatable from either the keypad 120 (via entry of a valid actuation passcode) or from an application installed on the mobile device (e.g., admin mobile device or guest mobile device). In such arrangements, because touch alone at the exterior of the door 14 cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and/or a Bluetooth interface 140), and a battery 142. The processing unit 116 is located within the interior assembly 108 and is capable of operating the wireless electronic lock 100, e.g., by actuating the motor 132 to actuate the bolt 114.

In some examples, the processor 136 can process signals received from a variety of devices to determine whether the wireless electronic lock 100 should be actuated. Such processing can be based on a set of preprogrammed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the wireless electronic lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the wireless electronic lock 100 with a remote system, such as the server 300 or mobile device (e.g., admin mobile device or guest mobile device). In certain embodiments, the security chip 137 includes a one-time write function in which a portion of memory of the security chip 137 can be written only once, and then locked. Such memory can be used, for example, to store cryptographic information derived from characteristics of the wireless electronic lock 100, or its communication channels with server 300 or one or more computing devices. Accordingly, once written, such cryptographic information can be used in a certificate generation process which ensures that, if any of the characteristics reflected in the cryptographic information are changed, the certificate that is generated by the security chip 137 would become invalid, and thereby render the wireless electronic lock 100 unable to perform various functions, such as communicate with the server 300 or the computing device 200, or operate at all, in some cases.

In some embodiments, the security chip 137 may be configured to generate a pairing passcode that, when entered using the keypad 120 of the electronic lock 100, triggers a BLE pairing mode of the electronic lock 100 that enables the electronic lock 100 to pair with a proximate computing device (e.g., the computing device 200 on which an electronic lock application associated with the electronic lock 100 is operating). In typical embodiments, the installer user selects an input to scan for local electronic locks and automatically pairs with the detected electronic locks within an appropriate range to provide firmware updates. Generally, the installer user 12 may be presented with a list of electronic locks within range of that installer user's computing device 200 that may be eligible for configuration, such as by providing over-the-air firmware updates. Typically, such firmware updates are performed by connecting to one electronic lock at a time to update the selected set of electronic locks serially.

In some examples, the pairing passcode is provided to the installer user 12 upon installing the electronic lock 100. In some embodiments, the installer user 12 does not need to use a pairing passcode (e.g., the lock application on the installer's computing device includes an alternative method for pairing with the electronic lock 100) and the pairing passcode is only used by an admin or guest user during the initial setup/activation of the electronic lock 100 (e.g., via an electronic lock application associated with the electronic lock 100 operating on the admin mobile device). In some examples, the pairing passcode is a random value. In some examples, the administrative user may be enabled to change the pairing passcode by setting their own code or by requesting a random value to be generated by the electronic lock application operating on the admin mobile device. In some examples, the length of the pairing passcode is variable. According to an aspect, for increased security, the pairing passcode may be a limited-use passcode. For example, the pairing passcode may be limited to a single use or may be active for a preset or administrative user-selected time duration. In further examples, a digit of the pairing passcode may correspond to a setting that may instruct the electronic lock 100 to perform one or more of: disable the pairing passcode after it has been used, keep the pairing passcode enabled after it has been used, or reset the pairing passcode to a new random value after it has been used.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and/or a Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with a guest or user computing device and the server 300 via the Wi-Fi interface, and can communicate with the computing device 200 when the mobile device is in proximity to the wireless electronic lock 100 via the Bluetooth interface 140. In some embodiments, the processing unit 116 is configured to communicate with the admin or user mobile device via the Bluetooth interface 140, and communications between the admin or user mobile devices and wireless electronic lock 100 when the admin or user mobile device is out of range of Bluetooth wireless signals can be relayed via the server 300, e.g., via the Wi-Fi interface 139.

The Bluetooth interface 140 is an example of a short range wireless interface capable of communicating with devices using a short range wireless protocol. Although Bluetooth is the example interface and protocol shown, other protocols may be used as well, via one or more additional wireless interfaces. In some examples, the electronic lock 100 can wirelessly communicate with external devices through a desired wireless communications protocol. In some examples, the computing device 200 provides a firmware update and/or a factor reset command to the electronic lock wirelessly via the Bluetooth interface 140. In some embodiments, when the wireless electronic lock 100 is first connected to a power source the electronic lock broadcasts signals over BLE to attempt to connect with a computing device 200 of an installer or a mobile device of a user. In some examples, an external device can wirelessly control the operation of the wireless electronic lock 100, such as operation of the bolt 114. The wireless electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the wireless electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device for communication of an intent to actuate the electronic lock 100. The processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user (e.g., administrative user or guest user) of a mobile device may access an account associated with the electronic lock 100 to view and modify settings of that lock, which are then propagated from the server 300 to the electronic lock 100. In other examples, the processor 136 may communicate with the server 300 via a connection through a mobile device, such as a mobile device within range of a short range wireless connection. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems. The electronic lock 100 may exchange certificates with a mobile device as part of a mutual authentication process used to establish a non-paired, secured connection between the electronic lock and a mobile device. Furthermore, the Bluetooth interface 140 may have a finite number of storage locations for bonded device key information. The non-paired, secured connection allows for keys to be exchanged which are not required to be stored in the finite storage locations of the Bluetooth interface 140.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection). In some embodiments, once the electronic lock 100 is installed and connected to power, the electronic lock 100 starts to send wireless signals through one of the interfaces 139, 140. In some embodiments, once the installer user 12 connects the electronic lock to a power source (e.g., the battery 142), the installation for the electronic lock is complete.

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 14 is locked and the motor 132 receives a lock command, then no action is taken. If the door 14 is locked and the motor 132 receives an unlock command, then the motor 132 actuates the bolt 114 to unlock the door 14.

As noted above, the optional interior antenna 134 may also be located in the interior assembly 108. In some examples, the interior antenna 134 is capable of operating together with the exterior antenna 130 to determine the location of a mobile device. In some examples, only a mobile device determined to be located on the exterior side 106 of the door 14 is able to unlock (or lock) the door 14. This prevents unauthorized users from being located near the electronic lock 100 and taking advantage of an authorized mobile device that may be located on the interior side 104 of the door 14, even though the authorized mobile device is not being used to unlock the door 14. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lock. It should be noted that the electronic lock 100 may be used on other types of doors, such as a garage door or a doggie door, or other types of doors that require an authentication process to unlock (or lock) the door.

In some embodiments, the wireless electronic lock 100 is made of mixed metals and plastic, with engineered cavities to contain electronics and antennas. For example, in some embodiments, the lock utilizes an antenna near the exterior face of the lock, designed inside the metal body of the lock itself. The metal body can be engineered to meet strict physical security requirements and also allow an embedded front-facing antenna to propagate RF energy efficiently.

In still further example embodiments, the wireless electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the wireless electronic lock 100 to perform certain processing, e.g., to communicatively connect to or transmit data to a mobile device in proximity to the wireless electronic lock 100.

Of course, in alternative embodiments, other lock actuation sequences may not require use of a motion sensor 135. For example, if a mobile device with permission is in valid range of the wireless electronic lock 100 when using a particular wireless protocol (e.g., BLE), then a connection will be established with the wireless electronic lock 100. Other arrangements are possible as well, using other connection sequences and/or communication protocols.

Figure 6:
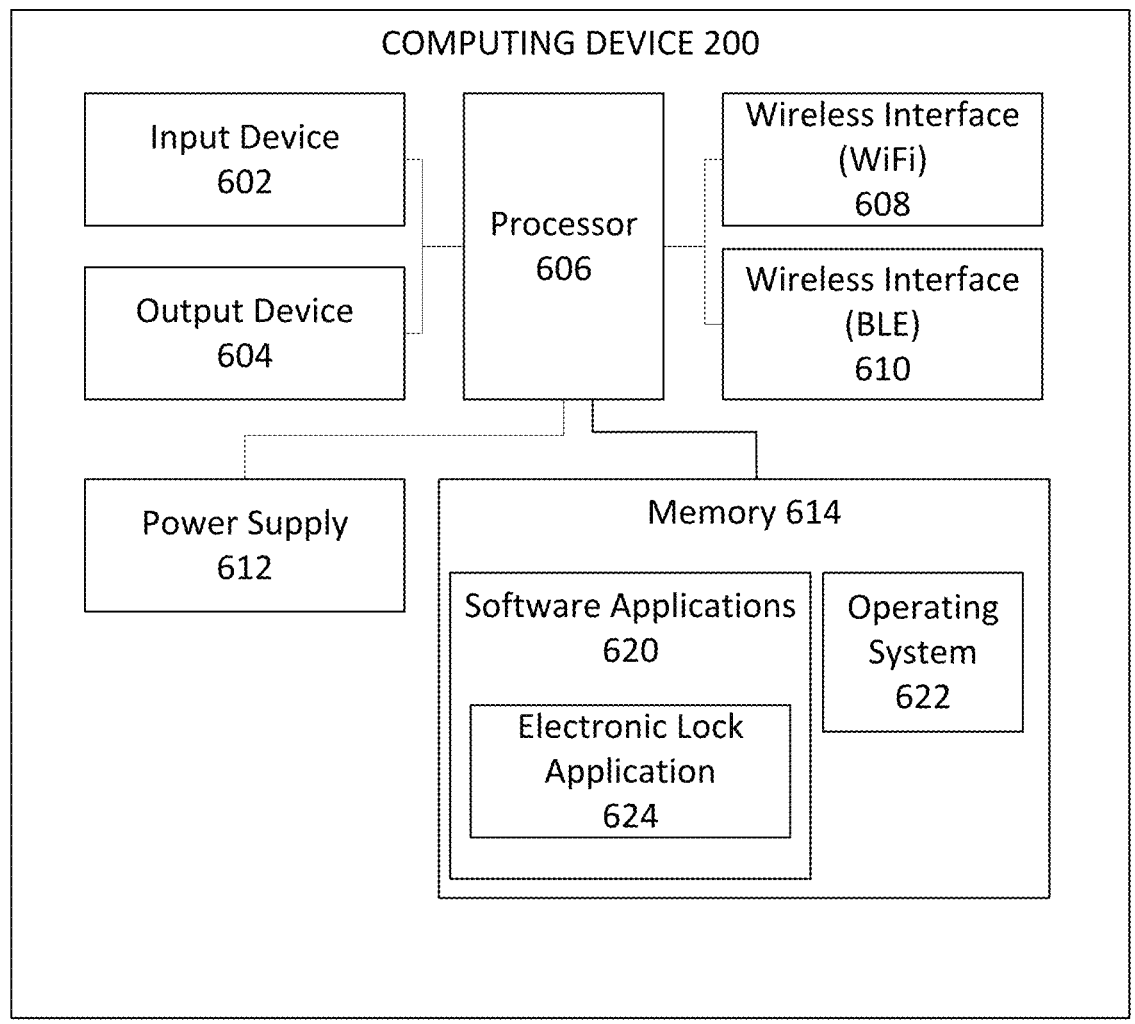
FIG. 6 illustrates a schematic representation of a mobile device seen in the environment of FIG. 1.

FIG. 6 illustrates a schematic diagram of a computing device, such as the computing device 200, usable in embodiments of the disclosure to enable Bluetooth® communication with the wireless electronic locks 100. In some embodiments, the computing device 200 operates to form a Bluetooth or BLE connection with a network enabled security device such as the wireless electronic locks 100. The computing device 200 then communicates with the cloud server 300 via a Wi-Fi or mobile data connection. The computing device 200, thus can operate to communicate information between the wireless electronic locks 100 and the server 300. The computing device 200 shown in FIG. 6 includes an input device 602, an output device 604, a processor 606, a wireless Wi-Fi interface 608, a wireless Bluetooth (e.g., BLE) interface 610, a power supply 612, and a memory 614.

The input device 602 operates to receive input from external sources. Such sources can include inputs received from a user (e.g., the installer user 12). The inputs can be received through a touchscreen, a stylus, a keyboard, etc.

The output device 604 operates to provide output of information from the computing device 200. For example, a display can output visual information while a speaker can output audio information. In some example, the display outputs user interfaces 900, 1000, and 1100 illustrated in FIGS. 9, 10, and 11, respectively.

The processor 606 reads data and instructions. The data and instructions can be stored locally, received from an external source, or accessed from removable media. The wireless Wi-Fi interface 608 is similar to the Wi-Fi interface 139. A Wi-Fi connection (e.g., the connection 20) can be established with the server 300. The wireless BLE interface 610 is similar to the Bluetooth interface 140. A BLE connection can be established with the wireless electronic locks 100. The power supply 612 provides power to the processor 606.

The memory 614 includes software applications 620 and an operating system 622. The memory 614 contains data and instructions that are usable by the processor to implement various functions of the computing device 200.

The software applications 620 can include applications usable to perform various functions on the computing device 200. One such application is an electronic lock application 624. In a particular embodiment, when the electronic lock application 624 is operating on the computing device 200, the electronic lock application 624 can be configured to automatically identify the wireless electronic locks 100A-N, and present a user interface at which an administrative user can select specific ones of those wireless electronic locks for configuration and/or providing firmware updates.

In additional examples (other than in the case of facilitating wireless over the air updates), the software applications 620 can provide to the user a user interface to setup/activate the electronic lock 100, generate an administrative user account that is associated with the electronic lock 100, optionally present the administrative user with a random pairing passcode for the electronic lock 100 (which may be reset or turned off by the administrative user), send (e.g., via one of the BLE connections 22A-N with the corresponding wireless electronic lock 100A-N or Wi-Fi connection 20) the pairing passcode to the electronic lock 100 for storage, and store the pairing passcode locally on the computing device 200 and/or the server 300.

In another embodiment, the electronic lock application 624 may provide a selectable 'add user' feature, which when selected, enables the administrative user to add another user (e.g., the guest user) to have access to one of the wireless electronic locks 100, receive administrative user-input of the guest user's electronic contact information (e.g., mobile device phone number, email address, messaging application identifier, social media account identifier), generate a link that can be shared with the guest user that allows the guest user to access the electronic lock application 624 and create a guest user account that is associated with the administrative user account and the electronic lock 100, and send a message including the link to the guest mobile device via the received electronic contact information.

Figure 7:
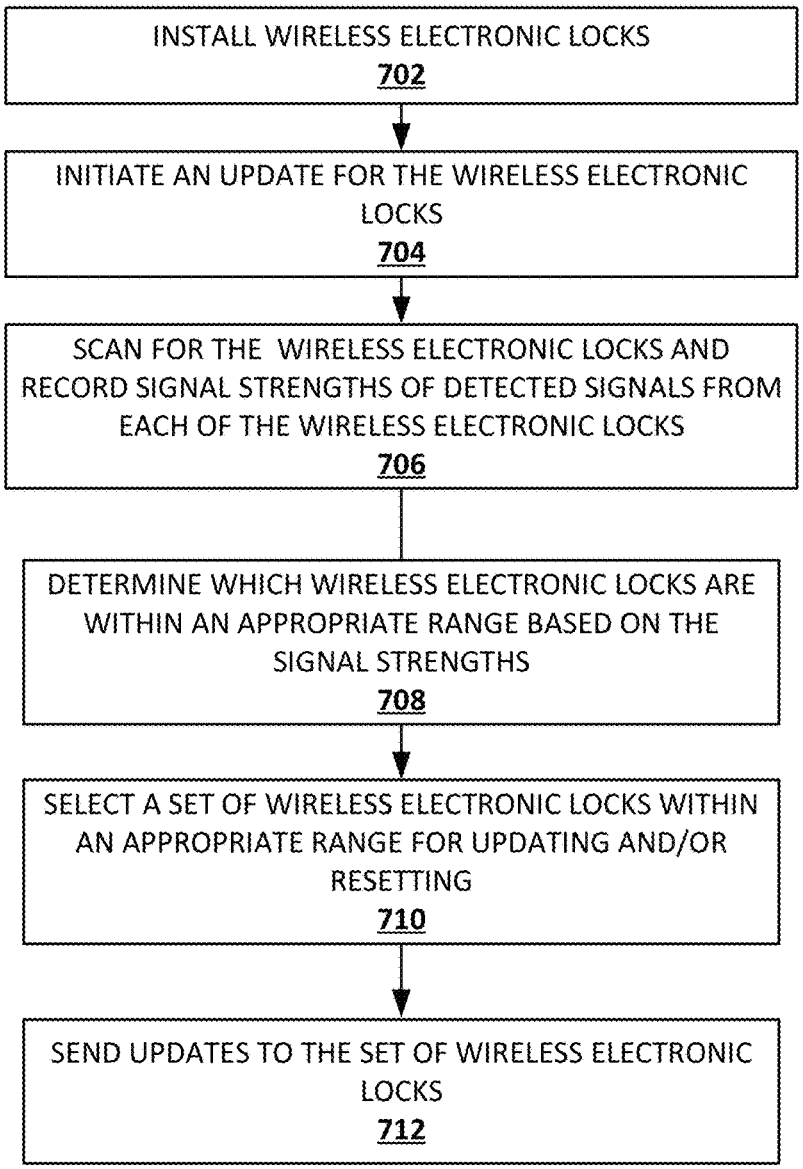
FIG. 7 illustrates an example flowchart of a method for providing firmware updates to a set of wireless electronic locks.

With reference now to FIG. 7, an example flowchart of a method 700 for providing firmware updates to a set of wireless electronic locks. The method 700 includes the operations 702, 704, 706, 708, 710, and 712. The operation 702 is for installing the wireless electronic locks and the operations 704 through 712 are for providing an update (such as a firmware update) to the electronic locks. In some embodiments, the operations 704 through 712 are performed on the computing device 200 as part of the electronic lock application 624.

The operation 702 installs the wireless electronic locks. In some embodiments, the operation 702 includes installing the wireless electronic locks 100 on the doors 14. For example, in a multifamily building an installer may install a large number of electronic locks on different units. In some embodiments, the installation for a single electronic lock is complete when the lock is connected to a power source. In some examples, the electronic lock does not need to be installed on a door and just needs to be connected to a power source (e.g., a battery). For example, a distribution center may want to update firmware on a large number of locks (without disassembling the locks) before shipping the locks or an installation contractor may want to update a received order of a plurality of electronic locks. In some examples, once an electronic lock is connected to a power source the electronic lock will automatically start broadcasting wireless signals to connect with a computing device. In other examples, the user must select an input on the lock before the lock starts to broadcast signals.

Figure 9:
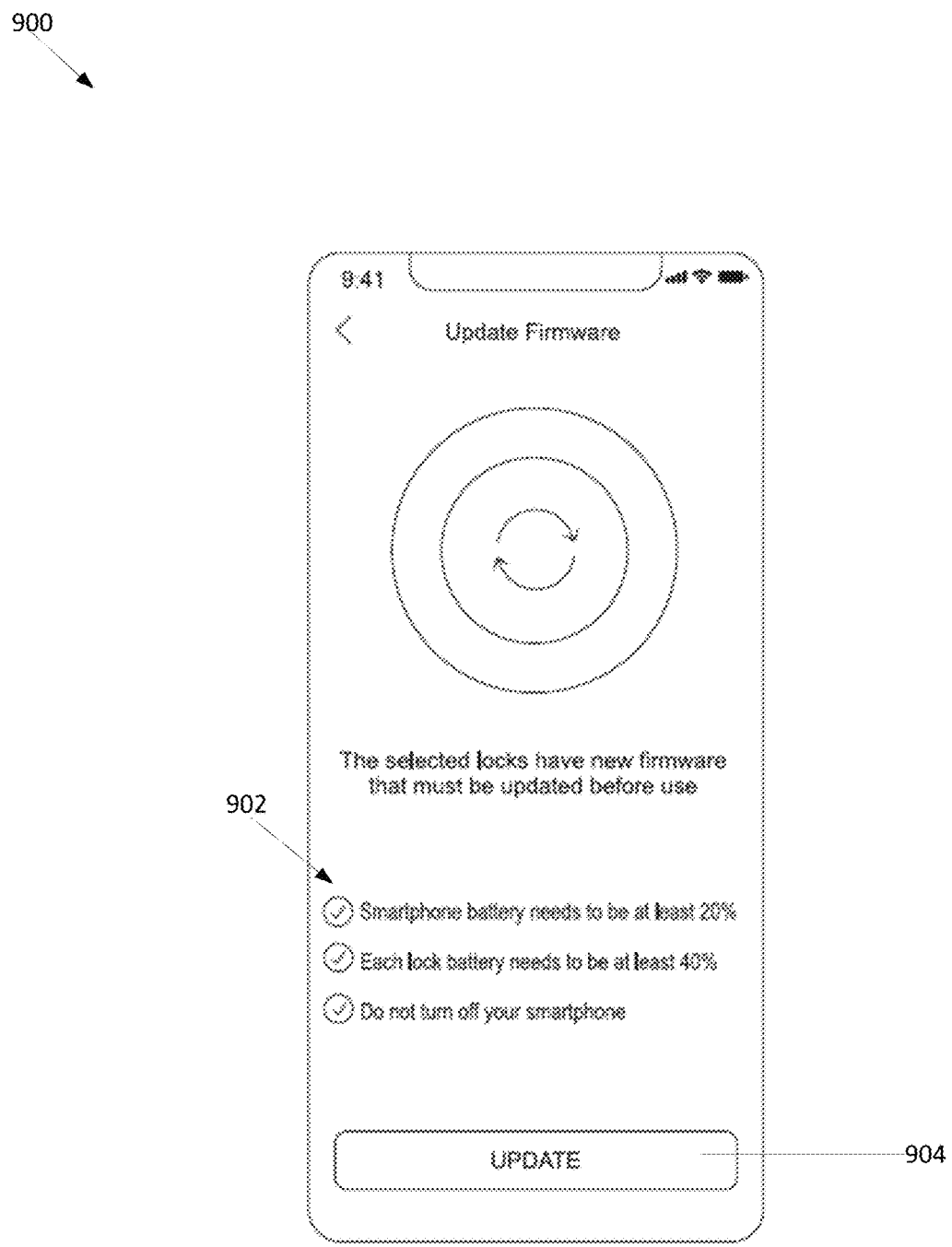
FIG. 9 illustrates an example user interface for updating a set of wireless electronic locks.

The operation 704 initiates an update for the wireless electronic locks. In some examples, a user opens open an electronic lock application 624 with an installation service. In some of these embodiments, the computing device 200 receives inputs selecting an option to update the firmware for a plurality of locks. In some embodiments, after the user selects an option to update the electronic locks a screen is presented showing warnings and recommendations which provide information about the process. For example, instructions that the locks need to be powered on, in a certain range, the computing device needs a certain amount of power, the electronic locks need a certain amount of power, etc. An example user interface 900 with warnings and recommendations is shown in FIG. 9.

The operation 706 scans for the wireless electronic locks and records signal strength samples of the locks. In some embodiments, the scan is performed for a set period of time. In some embodiments, the scan uses the BLE interface 610 to detect Bluetooth signals being broadcast from the wireless electronic locks 100. The signals from each detected lock are sampled over the set period of time, with the samples for each lock being stored with an identifier of the associated lock.

The electronic locks are compatible with an electronic application (e.g., the electronic lock application 624 shown in FIG. 6) executing on the computing device. For example, the electronic locks may broadcast an identifier which is recognizable by the electronic lock application 624 as a lock that the electronic lock application is compatible with. The electronic lock application may scan for devices with an individual identifier, an identifier of a list of identifiers, or range of identifiers which are compatible with the electronic lock application. In some embodiments, the wireless protocol may include a message which defines a name for the electronic lock, brand, etc. This information can also be scanned for as part of the operation 706.

The operation 708 determines which wireless electronic locks are within an appropriate range based on the signal strengths. In some examples, once the scan has ended, the electronic lock application 624 will take the signal strength samples from each lock and perform a mean filter to determine which locks are within an acceptable range. In other examples, a signal strength threshold is used or the individual locks are placed in buckets where each bucket includes an expected update time. For example, locks with weak signal may be placed in a bucket with a longer update time than locks with strong signals. In some embodiments, the recording also tracks the stability of the signal strength and electronic locks with unstable signals are filtered.

In examples, the wireless electronic locks of the present disclosure are within a range of the wireless protocol being used to perform an update, e.g., the Bluetooth, BLE, or Wi-Fi protocol as selected at the computing device 200. In particular examples, the wireless electronic locks of the present disclosure that are assessed for signal strength are limited to those which are compatible with an application executing on the computing device (e.g., a mobile application, where computing device 200 is implemented as a mobile device).

The operation 710 selects a set of wireless electronic locks within an appropriate range for updating and/or resetting. In some embodiments, a user selects which locks they want to upgrade. In alternative embodiments, a user scans a code (bar code, QR code, ID number) for each lock as they install the locks at the electronic lock application 624 keeps track of the locks and automatically selects the scanned locks. In some embodiments, the locks which are determined to be within an appropriate range for updating are presented to a user. In some of these embodiments, the available electronic locks are presented in a list with a unique ID which a user can find on the product, on a label for a product, and or on the products advertising. In some examples, the unique ID is a serial number. The user can use the ID to ensure they select the correct locks for updating. For example, each lock can be listed with a checkbox which a user can click to the select the lock for update. In some embodiments, each lock is selected by default and a user clicks a box to deselect the lock. In some embodiments, the list also includes a checkbox or other toggle button to select a lock for a reset (e.g., a factory reset). A user selects a check box associated with locks the user desires to reset after updating or just reset if the update checkbox is not selected. In other embodiments, a toggle input is presented to a user to either reset all locks after update or not perform a reset. Other settings can also be shown instead of the update or reset or in combination with the update or reset selections. For example, a selection to deactivate a lock, assign a lock to a particular unit or group, a cloud operation, etc.

The operation 712 sends updates to the set of wireless electronic locks. In some embodiments, updating the locks includes performing a firmware over-the-air-update via BLE from the electronic lock application 624 using the installation service on the computing device 200 to the wireless electronic locks 100. In typical embodiments, the updates are performed serially with one lock at a time. This allows an installer user 12 to leave the computing device 200 (e.g., tablet) close to the locks and continue doing other tasks or activities while the locks update. An example method 800 for updating a set of selected wireless electronic locks is illustrated and described in reference to FIG. 8.

Figure 8:
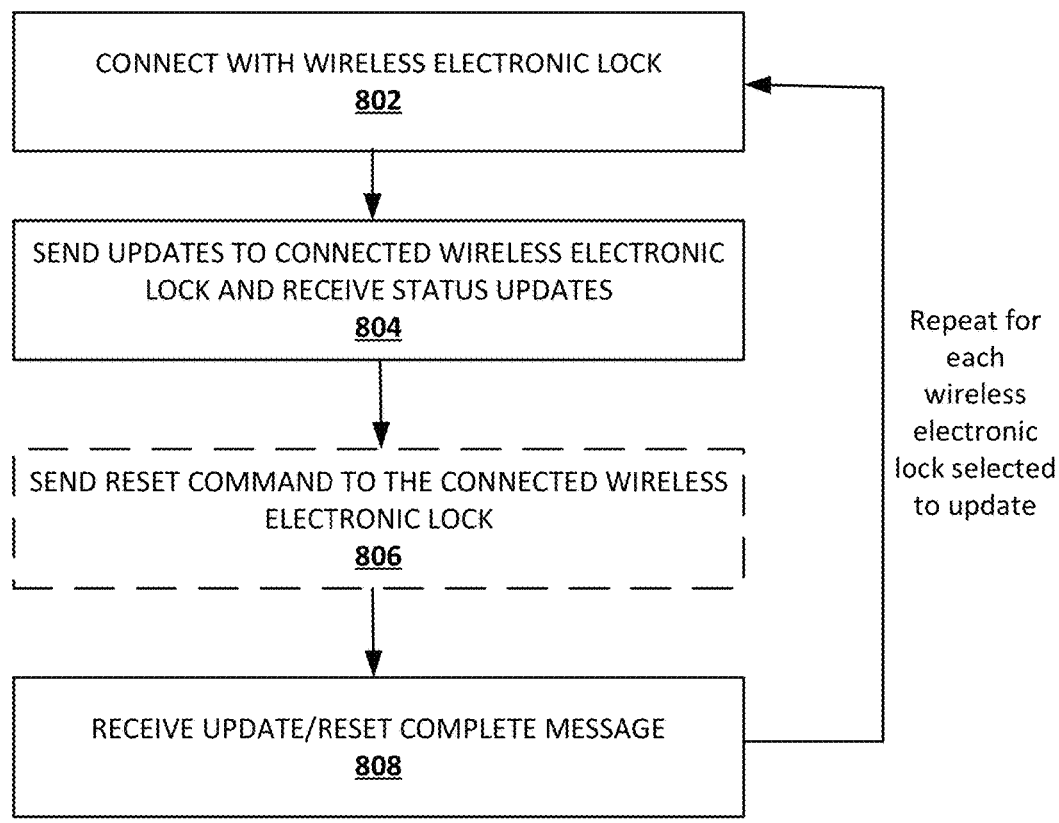
FIG. 8 illustrates an example flowchart of a method for updating a set of selected wireless electronic locks.

FIG. 8 illustrates an example flowchart of a method 800 for updating a set of selected wireless electronic locks. The method 800 includes the operation 802, 804, 806, and 808.

In some embodiments, the method 800 is performed on the computing device 200 using the electronic lock application 624.

In some embodiments, the method 800 is performed on one lock at a time for each selected electronic lock which is within an appropriate range of the computing device 200. Accordingly, the method 800 only advance to the next lock after all of the sets are completed for the current lock or when the process fails (e.g., losing signal with the electronic lock). In some embodiments, the method 800 is performed without any user interaction with the computing device, or with no required user interaction.

The operation 802 connects with a wireless electronic lock. In some examples, this is done using a lock activation and secure channel establishment process, an example of which is illustrated in US Patent Publication Number 2022/0335764 and entitled "ESTABLISHMENT OF SECURE BLUETOOTH CONNECTION TO INTERNET OF THINGS DEVICES, SUCH AS ELECTRONIC LOCKS", which is hereby incorporated by reference in its entirety. In alternative embodiments, the computing device includes a trusted certificate which allows is sent to the electronics in order to establish a secure communication channel. Other processes for establishing trust between devices can also be used.

In some preferred embodiments, the connection established with a wireless electronic lock may be formed such that no persisted, bonded connection is established between the computing device and electronic lock. Such an arrangement has an advantage that an installer does not need to manually confirm, on a user interface of the computing device, that the computing device should be bonded to each electronic lock individually. That is, the over the air update process may be performed serially, or sequentially, for each of a plurality of wireless electronic locks without requiring separate confirmation each lock. This improves user convenience by allowing an installer to initiate a single process that may then automatically occur for each of the plurality of selected wireless electronic locks.

Figure 10:
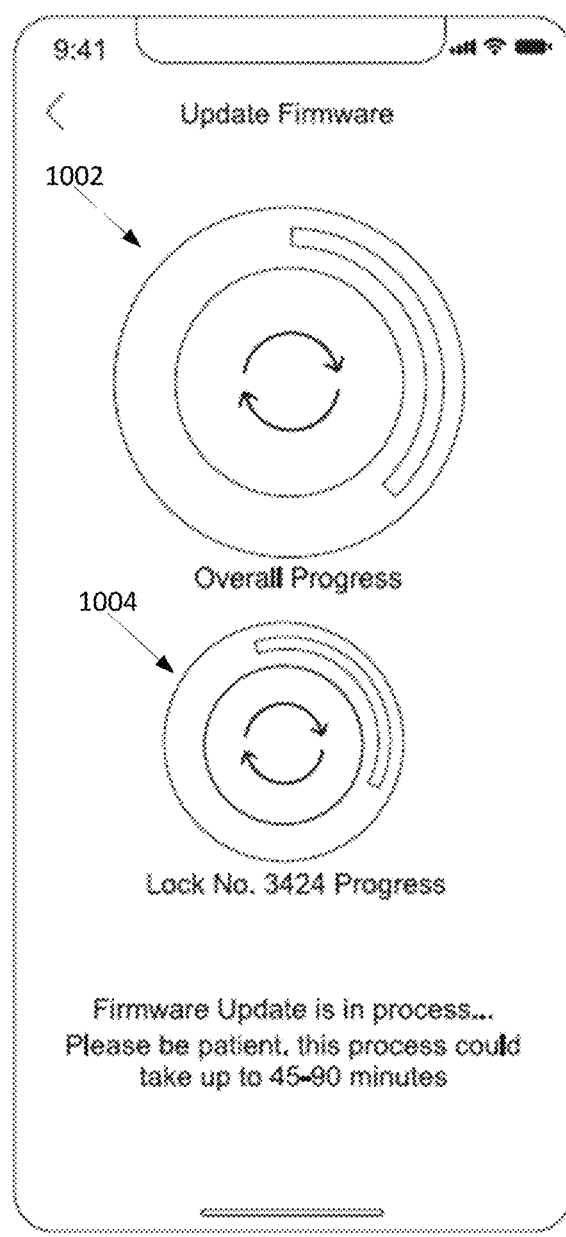
FIG. 10 illustrates an example user interface for tracking the progress for updating a set of wireless electronic locks.

The operation 804 sends updates to connected wireless electronic lock and receives status updates from the lock. Once the computing device has established a secure communication channel with the electronic lock, the computing device sends update bundles to the electronic lock. For example, the computing device in some embodiments send firmware update to the electronic lock in bundles. In some examples, the computing device may present a progress indicator to a user, based on the number of bundles sent or based on status updates received from the electronic locks. For example, the electronic lock may track an overall percentage complete and send a status percentage to the computing device over the BLE channel. In some embodiments, one progress indicator is presented showing the progress for the update of all the locks and a second progress indicator showing the update progress for a specific lock. In some embodiments, estimated times for the update to the current electronic lock and/or the overall update to all the locks is presented to a user. An example user interface 1000 displaying two progress indicators for updating a set of locks is illustrated in FIG. 10. In some examples, status notifications are sent to a user (e.g., at 25% 50%, and 75%). Other example user interfaces for tracking progress for updating a plurality of locks are illustrated and described in reference to FIGS. 13 and 14.

The operation 806 sends a reset command to the connected wireless electronic lock. In some embodiments, a user can select to reset a lock after the update is complete.

In these embodiments, the operation 806 sends a reset command to the electronic lock, wherein the reset command causes the electronic lock to perform a factory reset.

Figure 11:
FIG. 11. illustrates an example user interface for providing an update complete message to a user.

The operation 808 receives an update/reset complete message. At the operation 808, the computing device 200 receives a message indicating the current lock has completed the update and/or reset process. In some embodiments, a notification is also presented to a user. If there are more electronic locks to update, the method 800 is repeated for each remaining electronic lock. In some embodiments, after all selected locks have been updated, the user is presented a message that the update was completed successfully. In some embodiments, a list of locks which were updated successfully is presented to a user. One example user interface 1100 for displaying an update complete for a set of locks is illustrated in FIG. 11.

FIGS. 9-14 illustrate user interfaces for updating a plurality of wireless electronic locks. In some embodiments, any combination of the user interfaces shown may be displayed as part of an electronic lock application (e.g., the electronic lock application 624 shown in FIG. 6) on the installer user's computing device, such as the computing device 200 as shown in FIGS. 1 and 6.

FIG. 9 illustrates an example user interface 900 for updating a set of wireless electronic locks. The user interface 900 shows a criteria list 902 which displays requirements to update the electronic locks. Example requirements include a user computing device battery requirement, a lock battery requirement and a reminder to not turn off the installer user's computing device. Also shown is an update button 904 which, when selected, initiates an update process. In some embodiments, the user interface 1200 for selecting locks to update is presented in response to receiving a selection at the update button 904.

FIG. 10 illustrates an example user interface 1000 for tracking the progress for updating a set of wireless electronic locks. The user interface 1000 shows a visual representation 1002 of the overall progress for updating the electronic locks 100 and a visual representation 1004 of the progress for an individual lock currently being updated. In some embodiments, the user interface 1000 is presented after the user selects an installation button 1214 as shown in the user interface 1200 in FIG. 12. In some embodiments, once the update process is complete, the user interface 1100 shown in FIG. 11 is displayed.

FIG. 11. illustrates an example user interface 1100 for providing an update complete message to a user. The user interface 1100 is displayed after the update process for the selected electronic locks is complete. In the example shown, the user interface 1100 includes a continue button 1102 which may present a main menu or the electronic lock application or present a user interface requesting a selection for identifying additional locks to update or ending the update process.

Figure 12:
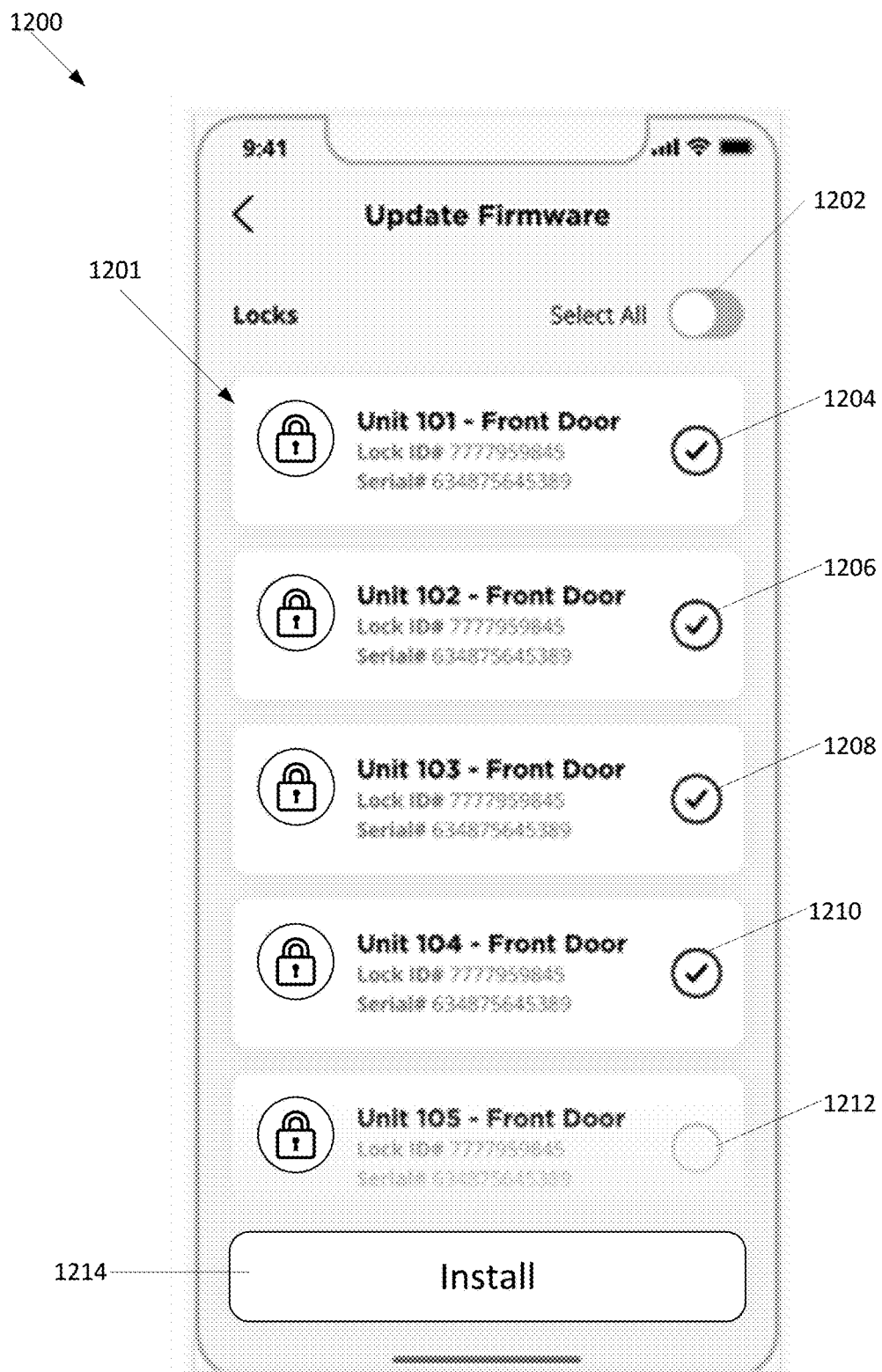
FIG. 12 illustrates an example user interface for selecting a set of wireless locks to update.

FIG. 12 illustrates an example user interface 1200 for selecting a set of wireless locks to update. The user interface includes a list of identified locks 1201. In some embodiments, the list a is a scrollable list. The user interface 1200 also includes a select all button 1202, which a user can toggle to select all of the identified electronic locks or deselect all of the identified locks. Also shown are individual lock selectors 1204, 1206, 1208, 1210, and 1212. Each of the individual lock selectors can be toggled between selected and unselected state. In the example shown, the individual lock selectors 1204, 1206, 1208, and 1210 are selected and the individual lock selector 1212 is not selected. In this example, the locks associated with "unit 101", "unit 102", "unit 103" and "unit 104" will be begin an update process when the user selects the installation button 1214.

In some examples, user interfaces 1300 and 1400 are alternative user interfaces for the user interface 1000 shown in FIG. 10. For example, after the user selects the installation button 1214, the user interface 1300 is shown and, in other embodiments, the user interface 1000, illustrated and described in reference to FIG. 10, is shown.

Figure 13:
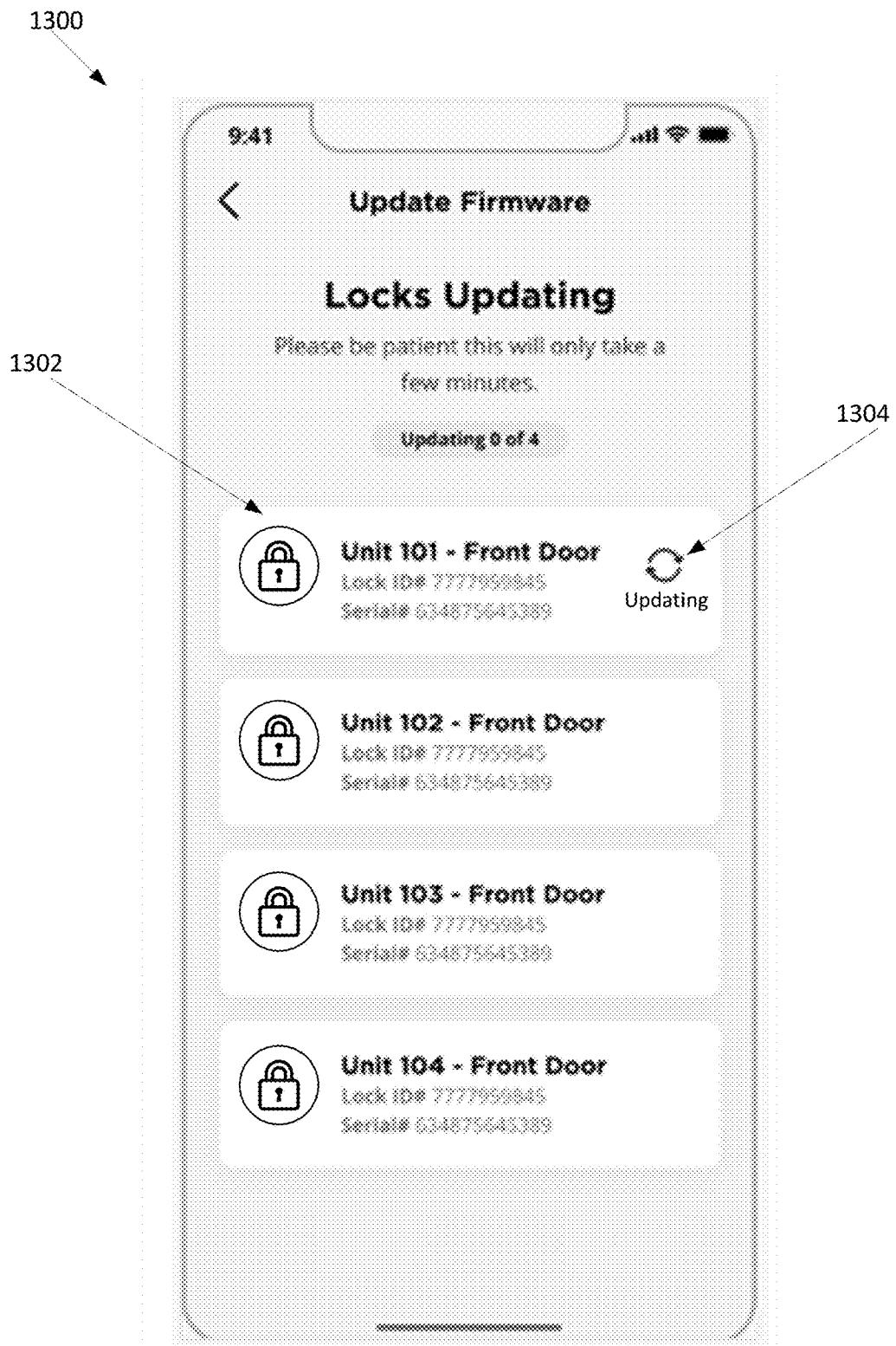
FIG. 13 illustrates an example user interface for tracking the progress for updating a set of wireless electronic locks.

FIG. 13 illustrates an example user interface 1300 for tracking the progress for updating a set of wireless electronic locks. The user interface 1300 presents a visual representation for tracking the progress of the update progress. In the embodiment shown, the user interface includes a list of locks selected for updating 1302. Also shown is a currently updating indicator 1304 showing that that the electronic lock for "unit 101" is currently being updated.

Figure 14:
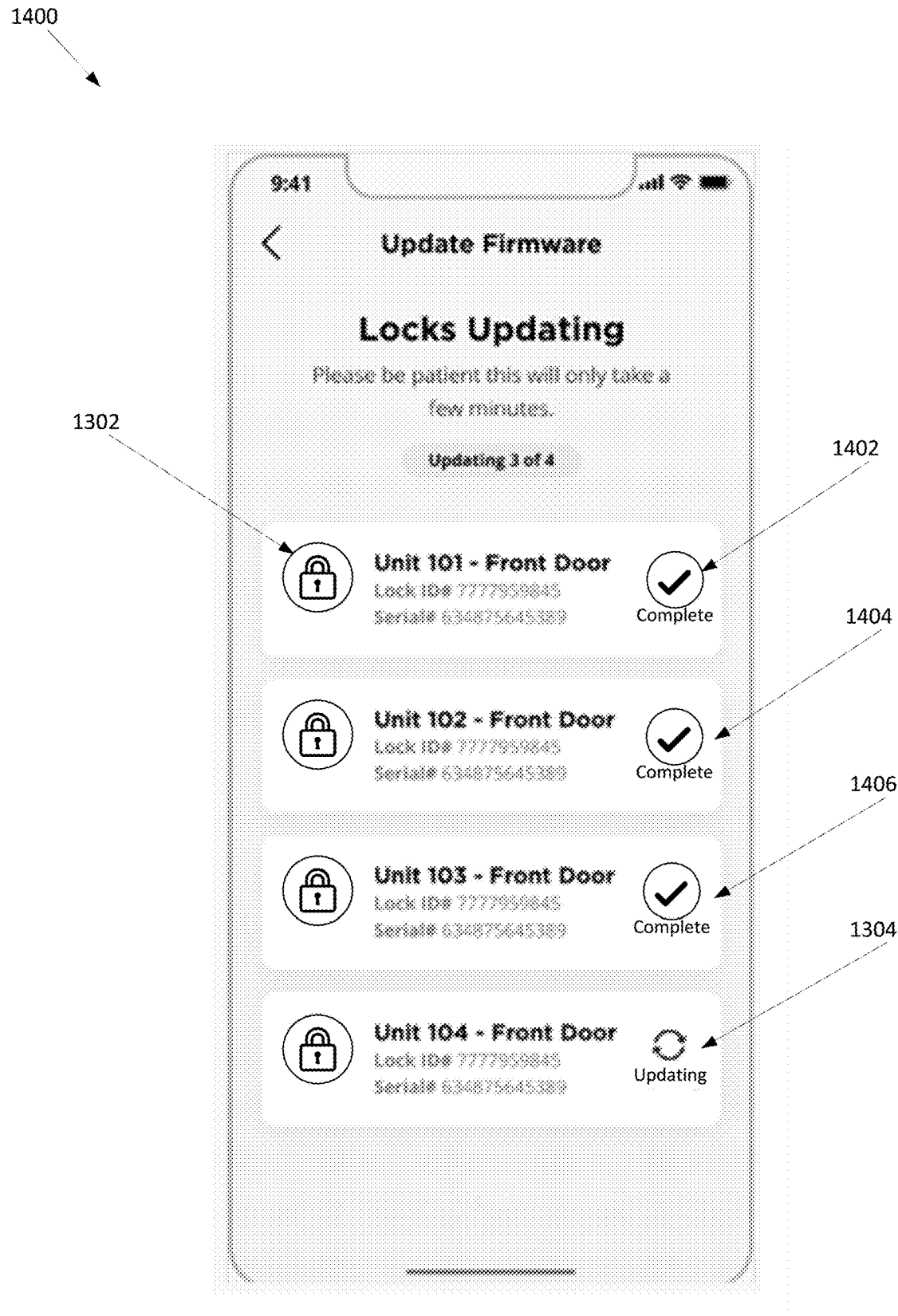
FIG. 14 illustrates another example user interface for tracking the progress for updating a set of wireless electronic locks.

FIG. 14 illustrates another example user interface 1400 for tracking the progress for updating a set of wireless electronic locks. The user interface 1400 shows a subsequent state of the update process as compared to the state shown in the user interface 1300. The user interface 1400 includes a list of locks selected for updating 1302 and the currently updating indicator 1304 showing that the electronic lock for "unit 104" is currently being updated. Also shown are update complete indicators 1402, 1404, and 1406. In some embodiments, once the update process is complete the user interface 1100 shown in FIG. 11 is displayed.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for updating wireless electronic locks, the method comprising:
   scanning, by the computing device, for signals broadcast from wireless electronic locks within proximity to the computing device, the wireless electronic locks being compatible with a mobile application executing on the computing device;
   while scanning, recording signal strengths of the signals broadcast from the wireless electronic locks;

determining a set of the wireless electronic locks which are within an acceptable range for updating based on the signal strengths, wherein the set of wireless electronic locks includes a plurality of wireless electronic locks;

sending updates from the computing device to the set of the wireless electronic locks; and presenting, at the computing device, a user interface including an update progress of the set of wireless electronic locks.

2. The method of claim 1, wherein the set of the wireless electronic locks is further determined based on:

providing a list of the set of the wireless electronic locks; and receiving one or more selections of the set of the wireless electronic locks on the list, wherein the set of the wireless electronic locks is updated to reflect the received one or more selections.

3. The method of claim 2, wherein the list includes an ID for each of the wireless electronic locks in the set.

4. The method of claim 2, wherein receiving one or more selections further includes receiving reset selections for the wireless electronic locks in the set, wherein a reset command is sent to the wireless electronic locks based on the reset selections.

5. The method of claim 1, wherein updating the set of the wireless electronic locks further includes:

sequentially connecting the computing device with each of the wireless electronic locks; and sending at least one update to each of the wireless electronic locks from the computing device.

6. The method of claim 5, wherein the connecting and sending is performed automatically without the computing device requiring user input.

7. The method of claim 5, wherein the computing device displays a user interface includes a first visual representation of an update progress for a currently connected wireless electronic lock and a second visual representation of an overall update progress for the set of the wireless electronic locks.

8. The method of claim 1, wherein the scanning is performed using a Bluetooth low energy (BLE) protocol.

9. The method of claim 1 wherein the computing device can perform additional tasks while updating the set of the wireless electronic locks.

10. The method of claim 1, wherein the scanning is done over a set period of time.

11. The method of claim 1, wherein the computing device downloads updates for the set of the wireless electronic locks from a server.

12. The method of claim 1, wherein the computing device includes a local copy of updates for the set of the wireless electronic locks.

13. The method of claim 1, wherein determining the set of the wireless electronic locks further includes using a mean filter to determine which of the wireless electronic locks are within the acceptable range with a stable signal strength.

14. A computing device comprising:

at least one processor; and at least one memory device, wherein the at least one memory device includes instructions which, when executed by the at least one processor, cause the computing device to:

scan for signals broadcast from wireless electronic locks within proximity to the computing device and record signal strengths of the signals broadcast from the wireless electronic locks, the wireless electronic locks being compatible with a mobile application executing on the computing device;

determine a set of the wireless electronic locks which are within an acceptable range based on the signal strengths, wherein the set of wireless electronic locks includes a plurality of wireless electronic locks;

send updates to the set of the wireless electronic locks; and present a status user interface including an update progress of the set of wireless electronic locks.

15. The computing device of claim 14, wherein to determine the set of the wireless electronic locks further includes to:

generate a selection user interface to display a list of the set of the wireless electronic locks; and receive inputs to select one or more of the wireless electronic locks in the set, wherein the updates are only sent to the selected one or more of the wireless electronic locks.

16. The computing device of claim 15, wherein the selection user interface displays an identifier for each of the wireless electronic locks in the set.

17. The computing device of claim 16, wherein the selection user interface displays an update selection and a reset selection next to the identifier for each of the wireless electronic locks in the set.

18. The computing device of claim 17, wherein the computing device automatically sends the updates to the set of the wireless electronic locks.

19. The computing device of claim 14, wherein the computing device is a mobile computing device.

20. A method for installing and updating a plurality of wireless electronic locks, the method comprising:

installing the plurality of wireless electronic locks on a plurality of doors, wherein installation of a wireless electronic lock is completed when the wireless electronic lock is connected to a power source; and updating the plurality of wireless electronic locks using a computing device, wherein the computing device is configured to:

scan for signals broadcast from the plurality of wireless electronic locks within proximity to the computing device and record signal strengths for the signals broadcast from the wireless electronic locks, the wireless electronic locks being compatible with a mobile application executing on the computing device;

determine a set of the wireless electronic locks which are within an acceptable range based on the recorded signal strengths, wherein the set of wireless electronic locks includes a plurality of wireless electronic locks;

send updates to the set of the wireless electronic locks; and present a user interface including an update progress of the set of wireless electronic locks.

* * * * *